United States Patent [19]
Leppek et al.

[11] Patent Number: 5,385,394
[45] Date of Patent: Jan. 31, 1995

[54] ANTILOCK BRAKE SYSTEM WITH CONTROLLED PRESSURE AUGMENTATION

[75] Inventors: Kevin G. Leppek, Rochester Hills; Alexander Kade, Grosse Pointe W, both of Mich.

[73] Assignee: General Motors Corporation, Detroit, Mich.

[21] Appl. No.: 59,397

[22] Filed: May 11, 1993

[51] Int. Cl.⁶ ............................................. B60T 13/20
[52] U.S. Cl. .................................... 303/115.2; 303/11
[58] Field of Search .................. 303/10, 11, 20, 113.4, 303/115.1–115.5, 116.1–116.4

[56] References Cited

U.S. PATENT DOCUMENTS

| | | | |
|---|---|---|---|
| 4,969,756 | 11/1990 | Villec et al. | 388/815 |
| 5,042,885 | 8/1991 | Villec | 303/115.2 X |
| 5,071,202 | 12/1991 | Fabris et al. | 303/115.2 |
| 5,102,207 | 4/1992 | Leppek et al. | 303/115.2 |
| 5,112,116 | 5/1992 | Mikhaeil-Boules et al. | 303/115.2 |
| 5,152,588 | 10/1992 | Bright et al. | 303/115.2 |
| 5,249,848 | 10/1993 | Matsuto et al. | 303/115.2 X |
| 5,257,856 | 11/1993 | Ota et al. | 303/115.2 X |

FOREIGN PATENT DOCUMENTS

| | | | |
|---|---|---|---|
| 398531 | 11/1990 | European Pat. Off. | 303/115.2 |
| 3121963 | 5/1991 | Japan | 303/115.2 |

Primary Examiner—Robert J. Oberleitner
Assistant Examiner—Alfred Muratori
Attorney, Agent, or Firm—Howard N. Conkey

[57] ABSTRACT

An electrically controlled fluid displacement piston positioned in a bore modulates braking pressure at a wheel brake for antilock controlled braking by modulating the position of the piston in the bore. At a fully extended home position, a check valve is unseated by the piston to hydraulically couple the brake system master cylinder to the wheel brake. To minimize the occurrences of the condition where the check valve is opened during ABS controlled braking, the piston is initialized prior to entry into antilock controlled braking at a position away from the check valve resulting in a greater volume of fluid being trapped upon entry into antilock controlled braking when a hydraulic passage in parallel with the check valve is closed in response to a detected incipient wheel lock condition. This permits the antilock brake system to apply a controlled brake pressure greater than the pressure initially trapped in the closed system. The position of the displacement piston is monitored and when the piston approaches the position at which the check valve will be opened thereby opening the fluid communication between the master cylinder and wheel brake, the antilock brake system control parameters are adjusted to increase the system sensitivity to wheel slip.

5 Claims, 6 Drawing Sheets

ANTILOCK BRAKE SYSTEM WITH CONTROLLED PRESSURE AUGMENTATION

BACKGROUND OF THE INVENTION

This invention relates to an antilock control system and method for controlling vehicle wheel brakes.

When the brakes of a vehicle are applied, a braking force is generated between the wheel and the road surface that is dependent upon various parameters which include the road surface condition and the amount of slip between the wheel and the road surface. This braking force increases as slip increases until a critical slip value is surpassed. Beyond the critical value of slip, the braking force decreases and the wheel rapidly approaches lockup. Therefore, to achieve stable braking, an antilock braking control system (ABS) seeks to operate wheel slip at or near the critical slip value.

One known ABS is based on an electrically controlled fluid displacement piston. In this system, the brake pressure is modulated by means of a DC torque motor positioning a displacement piston in a cylinder hydraulically coupled to the wheel brake and whose volume is modulated to control the hydraulic pressure at the wheel brake. The motor is controlled to position the piston at an initial, fully extended home position at which a check valve is unseated by the piston to hydraulically couple the brake system master cylinder to the wheel brake to allow normal braking. When antilock brake pressure modulation is required, the motor retracts the piston (which allows the check valve to close to isolate the master cylinder from the wheel brake) to reduce brake pressure at the wheel brake and thereafter modulates the piston position to provide pressure control for antilock braking. When antilock braking is no longer required, the motor returns the piston to its extended home position at which the check valve is again engaged and unseated by the piston.

During ABS controlled braking, when an incipient wheel lock condition is sensed, an ABS cycle is initiated beginning with a pressure release phase wherein the motor current is controlled to quickly retract the piston to release brake pressure to allow recovery from the incipient wheel lock condition. When a recovery from the incipient wheel lock condition is sensed, a pressure apply phase is initiated in which the motor current is controlled to extend the piston to reapply brake pressure. During the apply phase, the motor current is ramped to ramp the brake pressure at a controlled rate in direction applying brake pressure until an incipient wheel lock condition is again sensed after which the ABS cycle is repeated. During the apply phase, the check valve functions to assure that brake pressure generated at the wheel brake does not exceed the master cylinder output pressure.

The antilock brake control system set forth above further typically includes a hydraulic passage in parallel with the check valve and which is controlled by an electromagnetic valve. During normal vehicle braking in which the check valve is unseated by the piston, the valve is open to provide a redundant direct communication between the brake system master cylinder and the wheel brake to assure integrity of the braking system. Upon entry into antilock controlled braking, the valve is operated to a closed position so that when the check valve is closed upon retraction of the piston, the brake system is isolated from the master cylinder as detailed above.

The ABS based on an electrically controlled displacement piston as set forth above is commonly referred to as a closed system in that after ABS operation is initiated, a fixed volume of fluid is used. This fixed quantity of fluid is moved by the displacement piston to and from the wheel brake to perform the ABS function. The maximum brake pressure that can be achieved in this system is the hydraulic pressure trapped when the check valve is closed at the beginning of ABS operation. If this trapped pressure is insufficient to initiate an incipient wheel lock condition during the apply phase of normal ABS operation, the piston will engage and open the check valve during the apply phase before an incipient wheel lock is initiated to begin a pressure release phase. The opening of the check valve couples the high pressure output of the master cylinder to the wheel brake resulting in an uncontrolled fluid flow into the wheel brake with an unpredicted rapid rise in brake pressure and wheel slip that is not a result of normal ABS operation.

There are various reasons that insufficient pressure may be captured in the braking system. First, insufficient pressure may be captured because of a high initial brake pressure apply rate which results in the initiation of ABS control of the front wheels before weight is transferred from the rear wheels to the front wheels. This results in a higher brake pressure required at the front wheel brakes during the apply phase to initiate the release phase of the ABS cycle. Second, insufficient pressure may be captured because of a decrease in braking efficiency as a result of brake heating during the braking period. Third, insufficient pressure may be captured because the coefficient of friction of the road surface increases after the ABS is first engaged so that a higher pressure is required during the apply phase to initiate an incipient wheel lock condition.

SUMMARY OF THE INVENTION

It is one object of this invention to minimize the occurrences of the condition detailed above where the ABS controlled pressure available is insufficient for normal ABS pressure cycling. Another object of this invention is to minimize the occurrences of the condition where the check valve is opened during ABS controlled braking resulting in an unpredicted rise in wheel brake pressure during antilock controlled braking.

In one form of this invention, the displacement piston position is initialized prior to entry into antilock controlled braking at a position away from the check valve resulting in a greater volume of fluid being trapped in the closed system upon entry into antilock controlled braking when the hydraulic passage in parallel with the check valve is closed in response to a detected incipient wheel lock condition. This increased volume of working fluid in the closed system permits the antilock brake system to apply a controlled brake pressure greater than the pressure initially trapped in the closed system. The pressure increase is related to the amount of increased working fluid that can be moved by the piston to the wheel brake before the piston engages and opens the check valve. At all times, the check valve continues to assure that the wheel brake pressure does not exceed the master cylinder output pressure. In one form of the invention, the displacement position is retracted from a fully extended position at which the check valve is opened by an amount providing for the desired additional amount of trapped fluid (based upon a desired allowed pressure increase above the initial trapped pressure) upon entry into antilock controlled braking. Communication between the master cylinder and the wheel brake during normal braking is then provided via the hydraulic path in parallel with the check valve.

In one aspect of this invention, the amount of additional fluid trapped and the resulting available controlled pressure increase above the initial trapped pressure is related to a predetermined weight transfer from the rear wheels of the vehicle to the front wheels of vehicle when the brakes are applied.

In yet a further aspect of this invention, where opening of the check valve operated by the displacement piston unavoidably occurs during antilock controlled braking (as a result of, for example, a substantial increase in the road surface coefficient of friction) antilock brake system control parameters are adjusted to minimize the resulting increase in wheel slip. In accord with this aspect of the invention, the position of the displacement piston is monitored and when the piston approaches the position at which the check valve will be opened thereby opening the fluid communication between the master cylinder and wheel brake, the antilock brake system control parameters are adjusted to increase the system sensitivity to wheel slip (and therefore less sensitive to the anticipated rapid rise in wheel slip due to the rapid rise in brake pressure) and/or reduce the speed of the displacement piston.

In a specific form of the invention, prior to entry into antilock controlled braking, the displacement piston is moved to the fully extended home position and then retracted by a predetermined distance that provides for an additional amount of working fluid corresponding to the amount of pressure increase above the initial trapped pressure required during anticipated antilock controlled braking conditions. During antilock controlled braking, the piston position is continually monitored and when the piston approaches the fully extended home position at which the check valve will be opened, the antilock brake system control parameters are adjusted to minimize the increase in slip that will occur when the check valve is opened thereby opening the hydraulic communication between the master cylinder and the wheel brake. The parameters include decreasing the slip level initiating the pressure release phase of the ABS cycle and decreasing the speed of the piston movement.

DESCRIPTION OF THE DRAWINGS

The invention may be best understood by reference to the following description of a preferred embodiment of the invention and the drawings in which.

DESCRIPTION OF A PREFERRED EMBODIMENT

Figure 1:
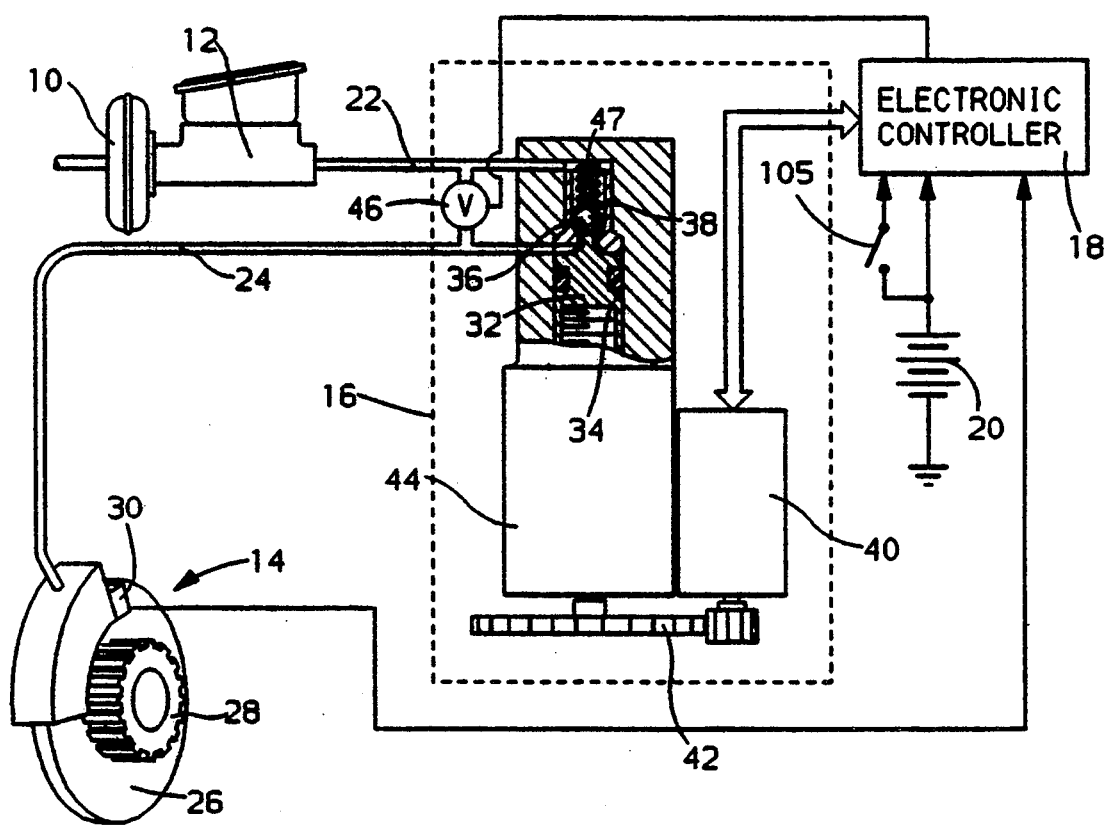
FIG. 1 is a diagram of a wheel braking system including a motor driven pressure modulator for limiting the wheel brake pressure for antilock brake control.

An electric motor driven antilock braking system (ABS) incorporating the principles of this invention is generally depicted in FIG. 1. Referring to FIG. 1, the braking system comprises a hydraulic boost unit (10), a master cylinder (12), a wheel brake (14) associated with one wheel of the vehicle, an electric motor driven hydraulic modulator (16), and an electronic controller (18) for operating the modulator with current from the vehicle storage battery (20). The master cylinder (12) develops hydraulic pressure in line (22) in relation to the force applied to an operator manipulated brake pedal, the line (22) being connected to the brake (14) via modulator (16) and brake line (24). The brake (14) is depicted as a disc brake caliper which develops braking force on the wheel rotor (26) in relation to the hydraulic pressure in the brake line (24). The wheel includes a wheel speed sensing assembly comprised of an exciter ring (28) rotating with the rotor (26) and therefore at the speed of the vehicle wheel and an electromagnetic sensor (30) which monitors the rotation of the exciter ring and provides a signal to the controller having a frequency proportional to the speed of the vehicle wheel.

The modulator (16) comprises a piston (32) axially displaced in a bore (34), a ball (36) resiliently seated on a ball seat (38) forming a check valve disposed between the brake lines (22) and (24), and a bidirectional electric motor (40) coupled to the piston (32) via a reduction gear set (42) and a screw actuator (44) to control the axial displacement of the piston (32) in the bore (34). A hydraulic bypass passage including a normally closed electromagnetic valve (46) is provided in parallel with the check valve formed by check ball (36) and ball seat (38) to provide a fluid flow path between the master cylinder (12) and the wheel brake (14) when the valve (46) is opened. The gear set (42) is made non-back drivable by hydraulic pressure acting on the head of the piston (32) such as by a known one-way spring clutch (not shown) or alternatively by an electromagnetic brake controlled by the controller (18).

The electronic controller (18) controls the energization of the motor (40) and operation of the valve (46). When the controller (18) energizes the motor (40) for rotation in a forward direction, the screw actuator (44) extends the piston (32) into the bore (34). When extended so as to engage the end of the bore (34), the piston (32) engages and unseats the ball (36) from its seat (38) to open the check valve and provide a fluid flow path between the master cylinder (12) and the brake (14). When the controller (18) energizes the motor (44) for rotation in the opposite or reverse direction, the screw actuator (44) retracts the piston (32) within the bore (34) permitting spring (47) to close the check valve by seating the ball (36) on the seat (38). This condition coupled with the energization of the valve (46) to close off the parallel bypass passage provides for the isolation of the brake line (22) from the brake line (24) and therefore the brake (14) from the master cylinder (12). In this condition, a closed system exists and the brake fluid in line (24) back fills the modulator bore (34) as the piston (32) is retracted relieving the fluid pressure developed at the brake (14). By controlling the motor (40), the pressure at the wheel brake (14) can therefore be modulated to controlled values less than the hydraulic pressure in the brake line (22). The pressure at the wheel brake (14) when both the fluid flow paths through the check valve and valve (46) are both first closed comprises an initial trapped pressure. If during antilock controlled braking operation, the piston (32) is extended to unseat the check ball (36), the high brake pressure output of the master cylinder is communicated to the brake (14). As will be described, this invention provides for minimizing this occurrence during antilock controlled braking and, when the ball (36) is unavoidably unseated from seat (38), this invention provides for adjustment of the wheel lock control parameters to minimize the effect of the rapid increase in brake pressure. At all times during antilock controlled braking, the check valve comprised of the ball (36) and seat (38) prevents the pressure at the wheel brake from exceeding the master cylinder output pressure. If this condition should exist, the ball is unseated by the pressure in the closed system to couple the brake to the master cylinder output.

Figure 2:
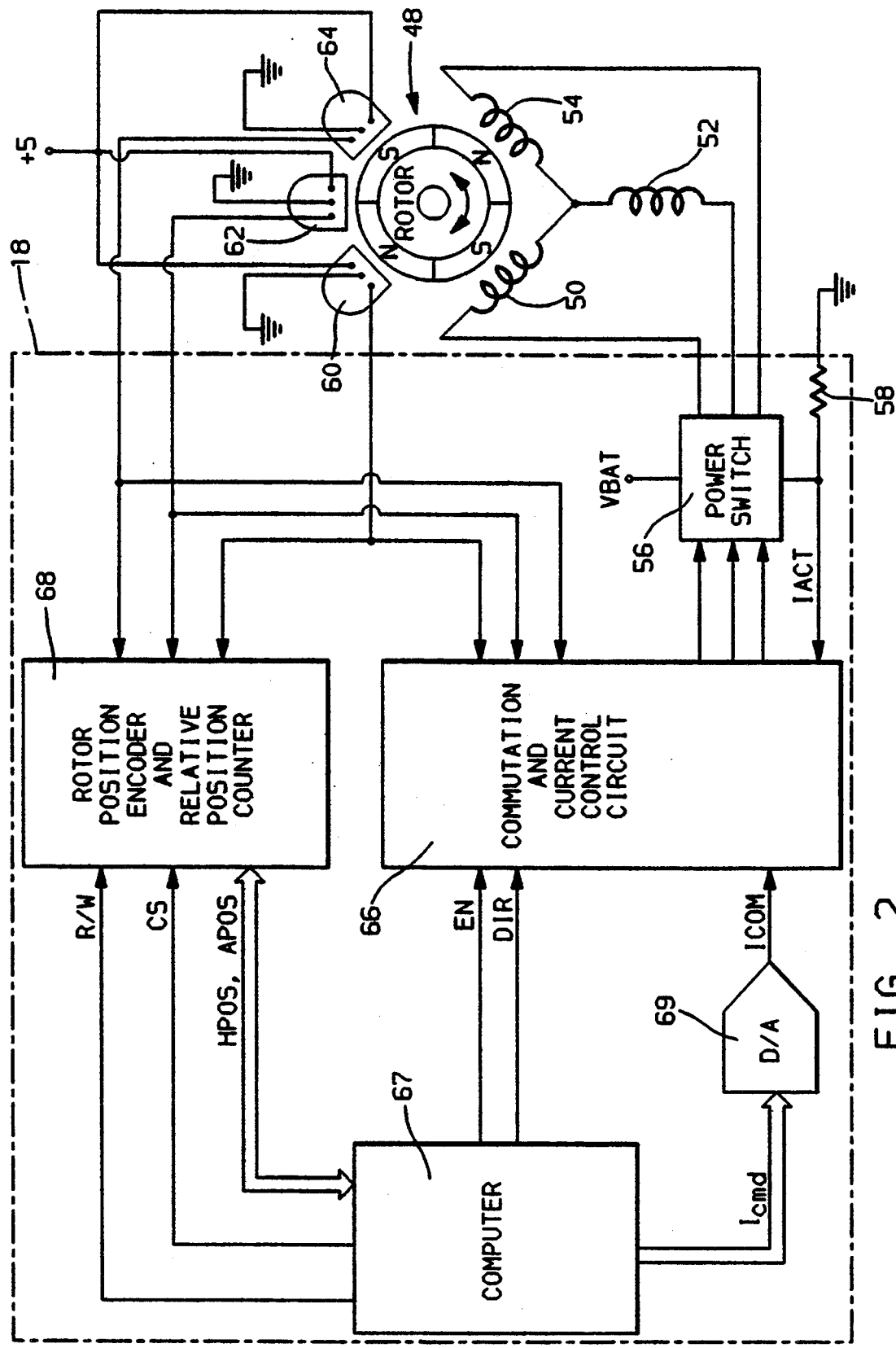
FIG. 2 is a diagram of a three-phase brushless DC motor and the controller for controlling operation of the motor for antilock brake control.

Referring to FIG. 2, the DC motor (40) takes the form of a brushless electrically commutated DC motor comprising a four-pole permanent magnet rotor (48) and three stator windings (50–54). The stator windings are connected in a Y configuration in which the windings are connected at one end to a common terminal and individually connected at their other ends to the output of a power switch (56) in the controller (18). The power switch (56) is comprised of a conventional full-wave bridge across which the voltage VBAT of the battery (20) is applied. Current through the power switch (56) and therefore the stator windings (50–54) of the motor (40) is sensed by a current sense resistor (58) the voltage across which represents the actual motor winding current IACT.

The motor (40) further includes conventional position sensors (60–64) in the form of Hall effect sensors situated 45 electrical degrees apart in the magnetic field of the rotor (48) and which are utilized by a standard commutation and current control circuit (66) in the controller (18) to control the switches in the full-wave bridge of the power switch (56) for commutating the phase windings (50–54).

The commutation and current control circuit (66) may take any known form such as a Unitrode UC1625 brushless motor controller chip. This circuit responds to an enable signal EN, a direction signal DIR and the position signals from the position sensors (60–64) for controlling the rotation and direction of the rotor (48). Further, the circuit (60) controls the current IACT in the stator windings (50–54) and therefore motor torque, to an input current command value ICOM. While any form of current control may be utilized, the preferred mode provides for a fixed frequency, pulsed with modulation of the power switch (56) to regulate the sensed motor current IACT to the commanded motor current value ICOM. In one embodiment, an error voltage may be generated based upon the difference between the commanded current value ICOM and the actual current value IACT. The error signal is compared by a comparator to the level of a constant frequency triangular wave signal to provide the duty cycle signal for controlling the power switch (56) to establish the commanded current ICOM. In another embodiment, in addition to this proportional control of the motor current, integral control may be provided to eliminate the error associated with solely proportional control.

To provide for antilock controlled braking, the controller (18) includes a computer (67) which executes an operating program permanently stored in memory to regulate the brake pressure applied to the wheel brake (12) in response to an incipient wheel lock condition by controlling the position of the piston (32) in the modulator (16). To monitor the position of the piston (32) within the bore (34), the controller utilizes a rotor position encoder and relative position counter circuit (68) which tracks the movement of the piston (32) by means of a counter that counts in one direction (such as down) the state changes in the position sensors (60–64) when the rotor (48) is rotating in a direction retracting the piston (32) away from its home position and counts in the opposite direction (up in this example) when the rotor (48) is rotated in the direction extending the piston (32) towards its home position. In order to establish a known relationship between the count in the counter and the position of the piston (32), the counter is preset to a predetermined count when the piston is in a known position. This known position is the fully extended position (defined as a "home position") at which the piston (32) contacts the end of the bore (34). At this position, the ball (36) is unseated by the piston (32) from the seat (38). Thereafter, by incrementing and decrementing this count based upon the state changes of the sensors (60–64) and the direction of rotation of the rotor (48), the counter tracts the position of the piston (32) relative to its home position.

The computer (67) provides for initializing the counter in the circuit (68) by commanding the commutation and current control circuit (66) to cause the motor (40) to rotate in a direction to extend the piston (32) to the home limit position. This is accomplished by issuing the enable signal EN and direction DIR commands along with a current command ICMD to a digital-to-analog converter (70). The analog current command output ICOM of the converter (70) is then provided to the commutation and current control circuit (66). When the computer determines the piston (32) has reached its home position, the computer (67) presets the position counter in the rotor position encoder and relative position counter (68) to a calibration home position value HPOS. Thereafter, the actual position of the piston (32) is tracked by the circuit (68) and provided upon command to the computer (67).

In accord with one aspect of the invention, after the computer provides for the initialization of the counter as set forth above, the displacement piston (32) is retracted a predetermined distance (which, incidentally, allows the ball (36) to be seated by spring (47) against the seat (38)) that is determined to establish a desired trapped volume of fluid upon energization of the valve (46) to isolate the master cylinder (12) from the wheel brake (14) in response to a sensed incipient wheel lock condition initiating ABS controlled braking. This trapped volume of fluid represents the closed system working fluid for antilock controlled braking. This working fluid volume is greater than the volume that would occur if the piston were in the fully extended position upon the initiation of antilock controlled braking and permits the antilock brake system to apply a controlled brake pressure greater than the pressure initially trapped in the closed system when the valve (46) is first closed. This minimizes the occurrences of the condition wherein the piston (32) is extended to the home position during the apply phases of ABS controlled braking at which the valve (36) is unseated from the seat (38) to hydraulically couple the master cylinder (12) to the wheel brake (14).

In accord with the operating program stored in memory, the computer (67) monitors the condition of the vehicle wheel via the wheel speed signal provided by the wheel speed sensor (30). When an incipient wheel lock condition is detected, the computer thereafter modulates the position of the piston (32) to regulate braking pressure to prevent a wheel lockup condition by determining a current command ICMD based upon the difference between a desired position and the actual position as provided by the circuit (68). This current command is provided to the digital-to-analog convertor (69) which supplies the analog current command signal ICOM to the commutation and current control circuit (66) along with the direction DIR and enable EN signals to control the motor (40) to establish the desired position.

Figure 3:
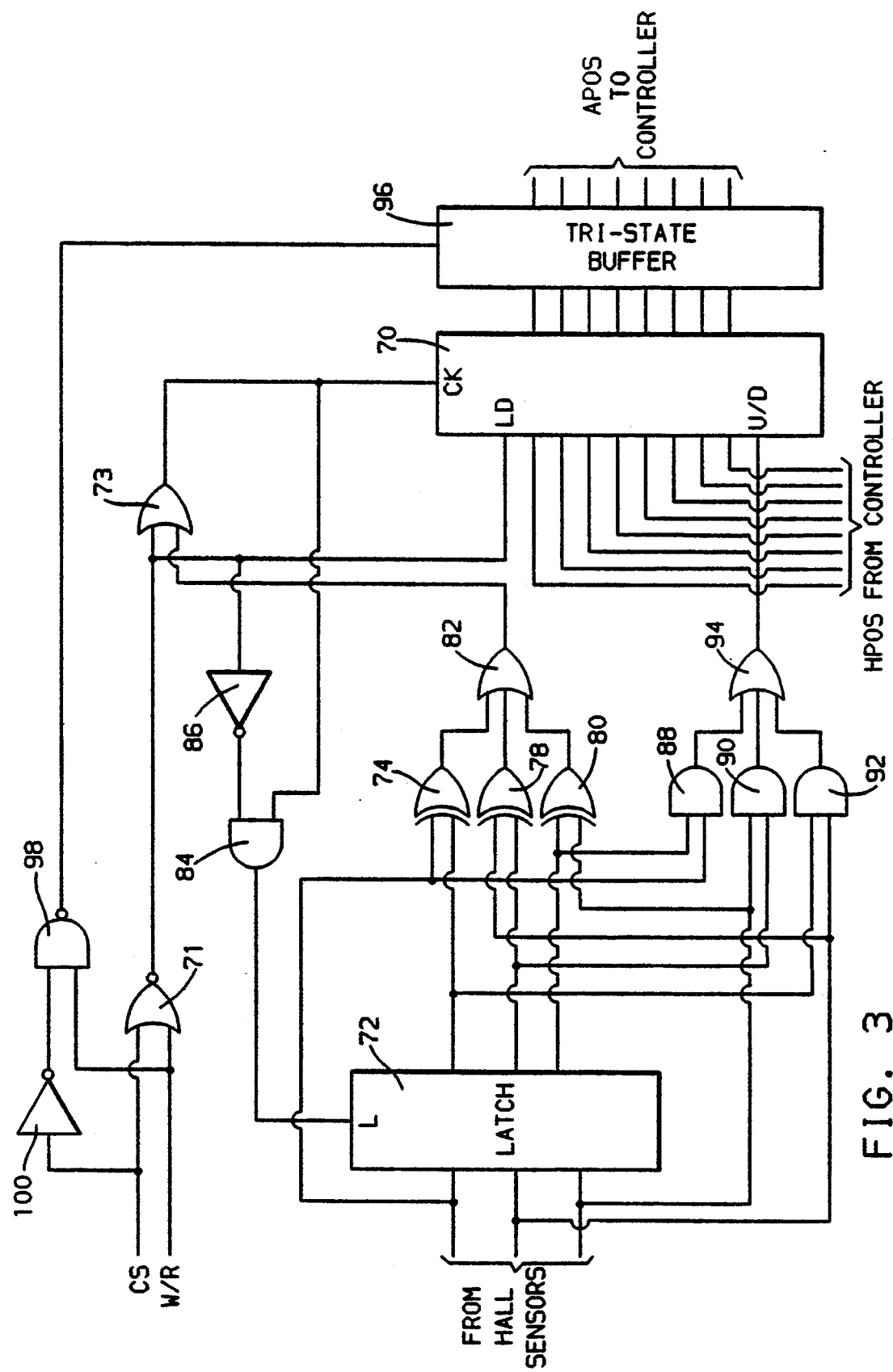
FIG. 3 is a circuit diagram of the rotor position encoder and relative position counter of FIG. 2.

Referring now to FIG. 3, the rotor position encoder and relative position counter (68) is illustrated. The count representing the position of the armature (32) is contained in an up/down counter (70). This counter is preset to a desired value by the computer (67) by applying the desired preset count such as the home position count HPOS to the inputs of the counter and then resetting the chip select CS line and the read/write R/W inputs to a NOR gate (71) to the proper logic levels. Thereafter, the counter (70) is either incremented or decremented based upon the output of the position sensors (60-64) and direction of rotation of the rotor (48) of the motor (40).

A change in the state of the position sensors (60-64) is sensed by a latch circuit (72) and a logic circuit comprised of EXCLUSIVE OR gates (74-80) whose outputs are coupled to an OR gate (82). In general, each of the EXCLUSIVE OR gates (74-80) compares the last latched state of one of the position sensors with the present state of the position sensor and if a difference is detected, the output of the respective exclusive OR gate is a logic 1 which is coupled to the clock input of the counter (70) via the OR gate (82) and the OR gate (73).

Simultaneously with clocking the counter (70), the output of the OR gate (73) latches the new state of the position sensors (60-64) into the latch circuit (72) via an AND gate (84) as long as the computer (67) is not in the process of loading the counter (70) such that the output of an inverter (86) to the AND gate (84) is a logic 1. If the computer is in the process of presetting the counter (70), the logic 1 output of the NOR gate (72) applied to the inverter (86) functions to disable the AND gate (84) to inhibit latching of the output of the position sensors (60-64).

Each time a change in the state of the position haul-effect sensors (60-64) changes states, the counter (70) is clocked by the output of the OR gate (82) via the OR gate (73). In order that the counter is clocked in direction according to rotation of the rotor (48), a quadrature detector comprised of AND gates (88-92) and OR gate (94) senses the direction of rotation of the rotor (48). Accordingly, when the rotor (48) is rotated in a direction retracting the armature (32) from the home position, the output of the quadrature detector circuit via OR gate (94) sets the counter (70) in a countdown mode such that each clock pulse from the OR gate (82) functions to decrement the count in the counter (70). Conversely, when the rotor is rotated in a direction extending the piston (32) toward its home position, the output of the quadrature detector via the OR gate (94) sets the counter (70) in a countup mode such that each pulse output of the OR gate (82) in response to a change in the state of the position sensors (60-64) functions to increment the count in the counter (70). In this manner, once preset by the computer (67) as described above, the count in the counter (70) provides an indication of the position of the piston relative to its fully extended position.

At any time the computer desires to read the actual position APOS of the piston (32), the CS and R/W lines are controlled to open a tristate buffer (96) via an AND gate (98) and inverter (100).

The computer (67) may take the form of a Motorola single chip microcomputer MC68HC11. This computer executes an operating program stored in a read only memory that contains the instructions necessary to implement the algorithm as set forth in FIGS. 4-6.

Figure 4:
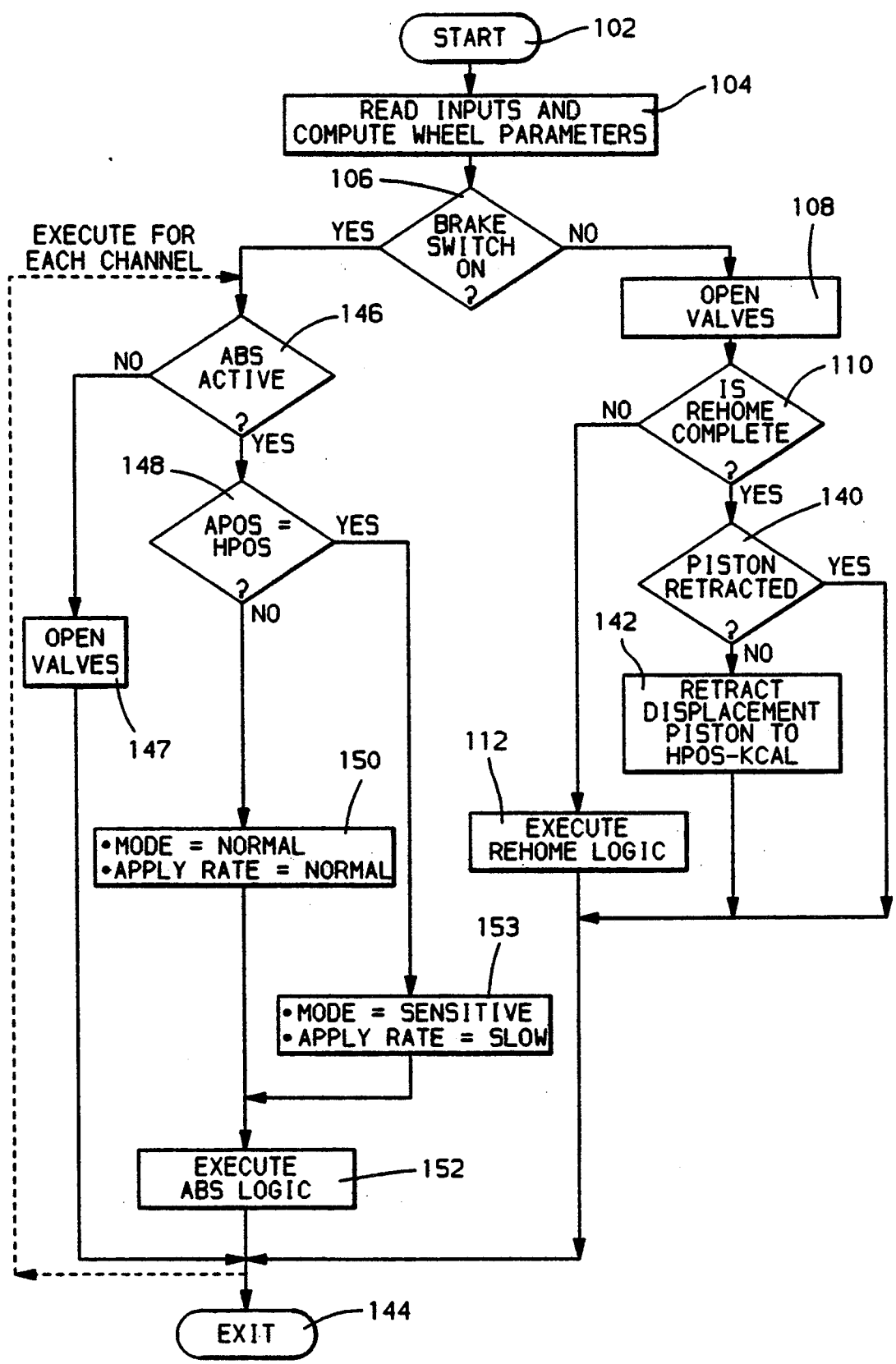
FIGS. 4, 5 and 6 are flow diagrams illustrating the operation of the controller of the FIG. 1 in accord with the principles of this invention.

Referring first to FIG. 4, the modulator (16) control cycle routine is illustrated. This control cycle is repeatedly executed at predetermined fixed time intervals such as five milliseconds. Upon the occurrence of the interrupt, the computer (67) begins executing the functions embodied in the routine of FIG. 4. The routine is initiated at step (102) and proceeds to step (104) where the wheel speed sensor information is read from each of the vehicle wheels. In this respect, it is understood that while the system illustrated in FIG. 1 shows a single channel for antilock brake control, multiple channels such as 2, 3 or 4 channels may be provided as required for the particular application. For example, a separate modulator (16) may be provided for each front wheel and a single modulator may be provided for the combined rear wheels for antilock brake control. The computer (67) will have associated with it a rotor position encoder and relative position counter (68), a commutation and current control circuit (66), a power switch (58) and a converter (69) for each of the wheel brake channels. Additionally at step (104), various wheel parameters are computed including individual wheel accelerations and individual wheel slip values.

The routine next determines whether or not the brake switch (105) is closed indicating the vehicle operator is applying the vehicle brakes. First assuming that the brakes switch is OFF indicating the vehicle operator is not applying the vehicle brakes, the program proceeds to de-energize the normally open solenoid valve (46) at step (108) to couple the output of the master cylinder (12) to the wheel brake (14) to thereby condition the braking system for normal braking operation independent of the condition of the check valve.

Next, step (110) determines whether or not a rehome routine has been executed for moving the piston to the fully extended position to re-establish the known relationship between the count in the counter (70) of FIG. 3 and the position of the piston (32) to enable tracking of the position of the piston (32) relative to its fully extended home position. Assuming that the rehome routine has not been fully executed, the program proceeds to step (112) where the rehome logic is executed. This rehome logic routine is detailed in FIG. 5.

Figure 5:
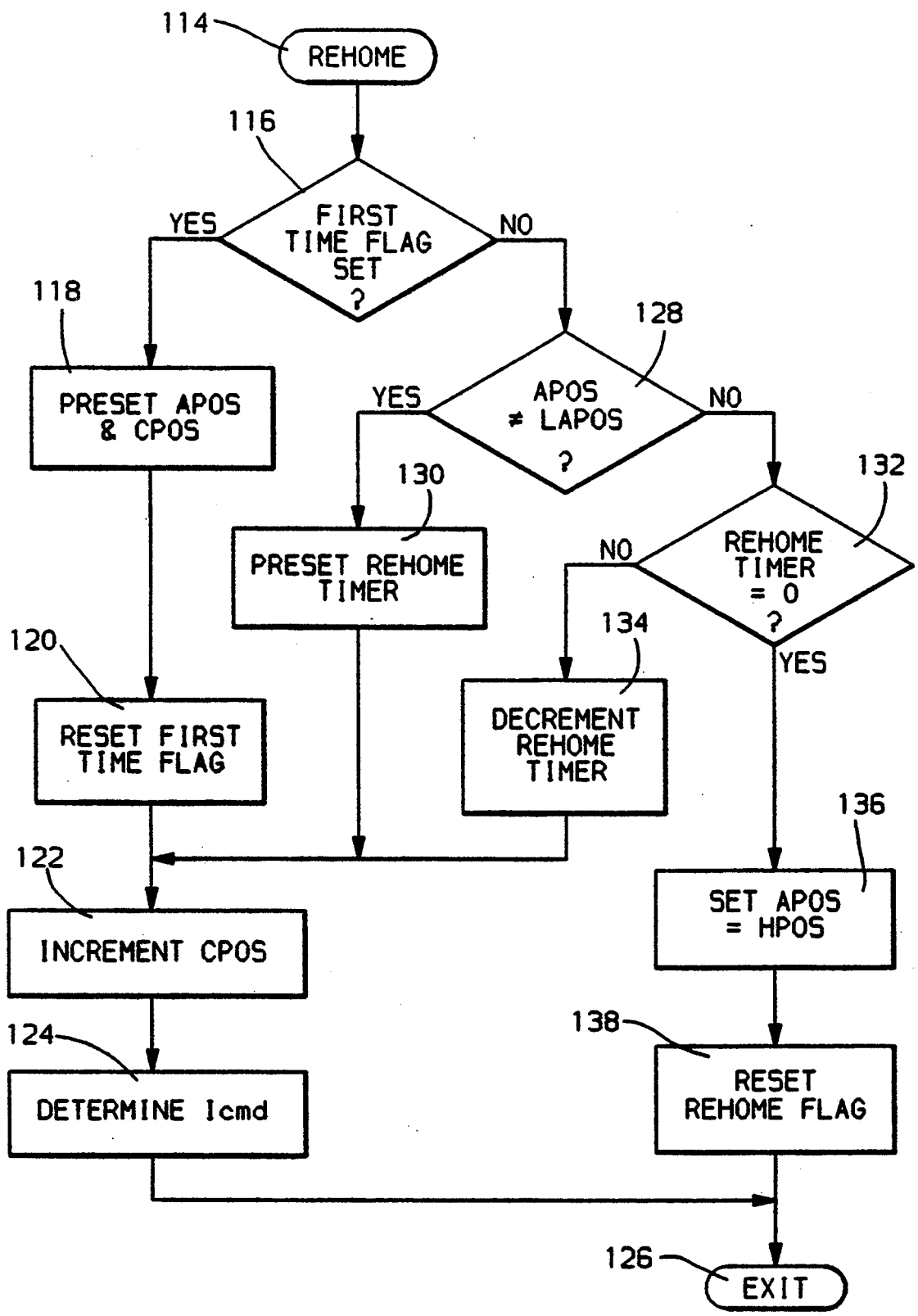

Referring to FIG. 5, the rehome routine is entered at point (114) and proceeds to sample the state of a first-time flag at step (116). When set, this flag indicates that the rehome routine is being executed for the first time since the powerup of the system. If it is the first time, it is desirable to preset both the actual count position APOS in the counter (70) and a commanded position count CPOS both to a minimum count value. This is accomplished via step (118) where the counter (70) is preset to the minimum count value in the manner previously described in reference to FIG. 3. The commanded position CPOS is also set to this minimum value at step (112). The first-time flag is reset at step (120) causing step (118) to be bypassed during subsequent executions of the rehome routine.

Following step (120), the commanded position CPOS is incremented at step (122). The routine then determines a current command value Icmd at step (124) based upon the difference between the commanded position CPOS of the piston (32) and the actual position APOS resident in the counter (70). In one embodiment, the current command Icmd determined at step (124) is an amount having a proportional relationship to the position error. In another embodiment, an integral term based upon the error may also be summed with this proportional term to establish the final current command Icmd provided to the digital-to-analog circuit (70) of FIG. 2. As previously described in relation to FIG. 2, the resulting current command ICOM output of the digital-to-analog converter (70) is provided to the commutation and current control circuit (66) which establishes a current value in the motor windings according to the commanded value.

Following step (124), the program exits the rehome routine at step (126). As long as the rehome routine is not complete, the routine of step (112) is re-entered upon each execution of the control routine of FIG. 4 via step (110).

Returning to step (116), during the second and subsequent executions of the rehome routine, the program proceeds from the step (116) to a step (128) where the actual piston position APOS represented by the count output of the counter (70) is sampled and compared to the last actual position LAPOS determined during the prior execution of the routine. If the piston is moving in response to the current command, indicating that the piston has not yet reached the physical limit position where it engages the end of the bore (34), the step (128) will detect a change in position represented by the inequality of APOS and LAPOS. Assuming this condition, a rehome timer is preset to a predetermined value at step (130). In general, the routine requires the piston (32) to be stationary for a predetermined time represented by the preset timer value before it is assumed that the armature has been fully moved to its extended position. Thereafter, the commanded position CPOS is again incremented and a current command Icmd is determined at step (124) based upon the resulting error in the actual and commanded position.

The foregoing steps (116,128,130,122,124) are repeatedly executed with each execution of the control cycle of FIG. 4 until such time that the step (128) indicates that the present and last positions of the piston (32) are equal. When this condition is sensed, the rehome timer is sampled at step (132). If not zero, the timer is decremented at step (134) after which the commanded position is again incremented at step (122) and a new current command value established based upon the resulting error at step (124).

Whenever step (132) determines that the rehome timer has been decremented to zero indicating that the piston (32) has been stationary for the required period of time indicating it has been moved to its fully extended home position, the rehome routine proceeds to a step (136) where the count APOS in the counter (70) is preset to the predetermined home position count HPOS representing the position of the piston (32) in the fully extended limit position. When preset to this value, the count in the counter (70) thereafter has a predetermined known relationship to the actual position of the piston (32) as it is moved in the bore (34) via operation of the motor (40). With this knowledge, intelligent control of the pressure applied to the wheel brakes (12) for antilock brake control may be established based upon a direct correlation between brake pressure and the piston (32) position. Further, with this knowledge, the piston (32) can be positioned at any desired absolute position relative to its fully extended position.

When the preset step (136) has been executed, the rehome flag is set at step (138) to indicate the rehome routine has been executed. During the next execution of the control cycle illustrated in FIG. 4, the routine senses the set state of the rehome flag at step (110) to bypass the rehome logic of step (112) and proceed to reposition the piston (32) in accord with a principle feature of this invention. In general, the piston is retracted from the fully extended home position by a predetermined amount to increase the volume of working fluid that will be trapped in the closed system upon entry into antilock controlled braking in response to a sensed incipient wheel lockup condition and which can be displaced by the piston to increase the controlled brake pressure that can be applied above the pressure that is initially trapped in the closed system upon entry into antilock controlled braking. As previously described, this reduces the potential of moving the piston (32) to unseat the ball (36) from the seat (38) during normal ABS pressure cycling.

In the preferred embodiment, the displacement piston (32) is retracted by an amount to increase the trapped volume of the fluid in the closed system by an amount that enables the controlled pressure during the apply phase of the ABS pressure control cycle to increase above the initial trapped pressure by an amount based on the expected weight transfer from the rear wheels to the front wheels of the vehicle during vehicle braking. For example, for a vehicle which weighs 3000 lbs. with a front-to-rear static weight distribution of 60%–40%, a front-to-rear weight distribution at 0.9 G deceleration of 80%–20%, a front brake specific torque of 1.4 ft.-lbs./psi, a displacement piston (32) area of 0.25 in.$^2$, and a brake caliper stiffness of 16,000 psi/in.$^3$, the required distance from the top of the bore is calculated as follows:

Weight on front tires at low deceleration: 3000 lbs.*60%=1,800 lbs.

Weight on front tires at high deceleration: 3000 lbs.*80%=2,400 lbs.

Weight transfer from front to rear wheels: 2,400 lbs.−1,800 lbs.=600 lbs.

Torque change to lock wheels (1 ft. rolling radius): 600 ft.-lbs.

Pressure change to lock wheels: 600 ft.-lbs./1.4 ft.-lbs./psi.=429 psi.

Volume change to lock wheels: 429 psi./16,000 psi./in.$^3$=0.027 in.$^3$

Displacement position motion: 0.27 in.$^3$/0.25 in.$^2$=0.1 in.

According to the foregoing example, the displacement piston (32) should be positioned 0.1 inches from the fully extended position of the bore to allow sufficient controlled pressure increase to control the wheel lock condition while at the same time avoid movement of the piston (32) to the home position thereby unseating the ball (36) from the seat (38). The foregoing is provided simply by way of example, it being understood that other criteria may be used to determine the amount of additional fluid to be trapped in the close system upon entry into antilock brake control and thereby the amount of pressure increase over the initial trapped pressure before the piston (32) functions to unseat the ball (36) from the seat (38) of the check valve.

Returning to step (110), when the rehome routine is completed, the program proceeds to step (140) to determine whether or not the displacement piston has been retracted to the desired position corresponding to the desired volume of fluid to be trapped in the close system upon entry into antilock controlled braking. If the piston has not been retracted to the desired position, the program proceeds to step (142) to retract the piston to a commanded position CPOS that is set equal to the home position HPOS determined by the rehome logic of step (112) minus a calibration value KCAL providing for the increased trapped fluid volume. This routine provides for determining a current value Icmd based upon the difference between the commanded position CPOS of the piston (32) and the actual position APOS resident in the counter (70). The current command may include integral and proportional terms summed to establish the final current command provided to the digital-to-analog circuit (70) of FIG. 2.

Following step (142), the program exits the routine at step (144). As long as the brake switch (105) has not been closed via operation of the brake pedal by the vehicle operator, the steps (140) and (142) are continually repeated until such time that the piston has been retracted to the desired position. Thereafter, the routine of step (142) is bypassed via step (140).

By positioning the piston (32) as set forth above, when the valve (46) is closed to isolate the master cylinder from the wheel brake (14) (the ball (36) having been seated on the valve seat (38) upon retraction of the piston (32)), the volume of working fluid trapped in the closed system permits the antilock brake system to apply a controlled pressure that is greater than the brake pressure initially trapped in the closed system upon the energization of the valve (46). As previously indicated, this reduces the occurrences of a condition whereat the check valve is opened by normal operation of the antilock brake control routine which results in an uncontrolled increase in pressure from the high pressure output of the master cylinder (12).

Returning to step (106), if the brake switch (105) is actuated indicating the vehicle operator is applying the vehicle brakes, the routine proceeds to execute a series of steps 146–153 for each braking channel selected in sequence. The following description is directed to one of the braking channels with the associated modulator, wheel and wheel parameters. For the selected channel, step (146) is first executed to determine whether or not the antilock controlled braking has been initiated in response to a sensed incipient wheel lockup condition. This may be in response to a flag set by the ABS logic as executed for the selected channel whenever the routine first begins controlling brake pressure in response to an incipient wheel lock condition. Assuming that the ABS system is not actively controlling the wheel brake pressure, a step (147) de-energizes the valve (46) to open communication between the master cylinder (12) and brake (14) to allow normal braking.

If however step (146) determines that the antilock brake control system is controlling brake pressure in response to an incipient wheel lockup condition, the routine proceeds to a step (148) to determine if the actual piston position APOS is equal to the home position HPOS or, in another embodiment, a position substantially at home position. Assuming initially that this condition does not exist, the program proceeds to a step (150) where a normal operating mode and a normal brake pressure apply rate are indicated. Thereafter, an ABS logic routine is executed at step (152). This routine is a standard routine and may take the form as illustrated in FIG. 6.

Returning to step (148), if the piston position APOS is at the home position (or nearly so in another embodiment), the antilock brake system is set to an operating mode which minimizes the system response to the rapid rise in brake pressure that results when the check valve is opened by the piston (32) to couple the master cylinder (12) output pressure to the wheel brake (14). This is accomplished at step (153) where a sensitive mode and a slow apply rate are indicated.

Figure 6:
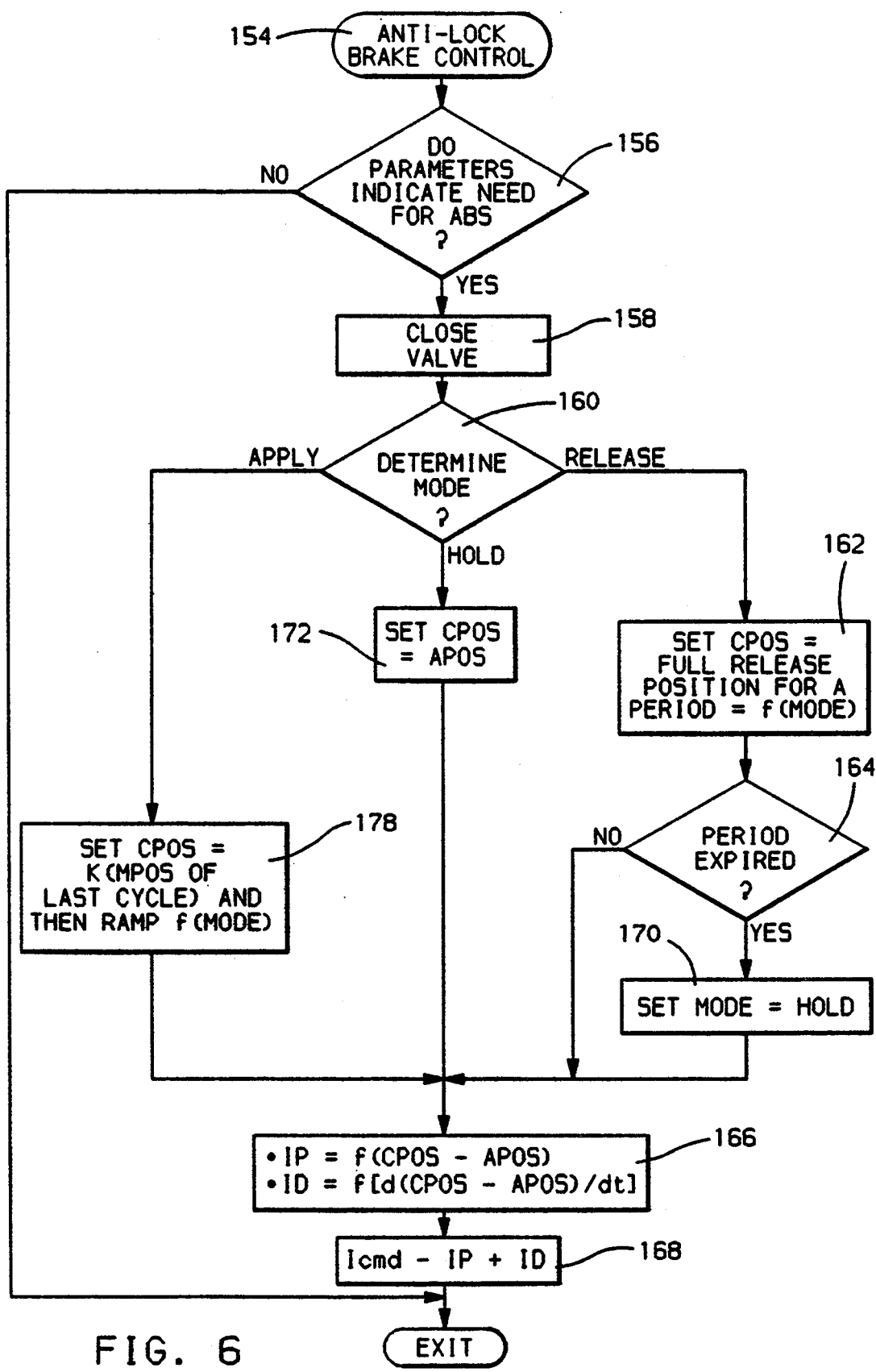

Referring to FIG. 6, the antilock brake control routine (152) is entered at step (154) which determines from a lookup table stored in read-only memory whether or not antilock controlled braking is required based upon a predetermined schedule that is a function of wheel acceleration and wheel slip. The table establishes a boundary condition such that when the combination of acceleration and wheel slip indicate an incipient wheel lockup condition, a need for antilock controlled braking is indicated. If step (156) does not indicate such an incipient wheel lockup condition, the routine returns to the control cycle of FIG. 4. However, if step (156) determines via the lookup table that an incipient wheel lockup condition exists, the program then proceeds to close the solenoid valve (46) at step (158) to isolate the master cylinder (12) from the wheel brake (14). Since the check valve comprised of the ball (36) and seat (38) is initially closed due to the retraction of the piston via the routine of step (142), when the solenoid is first closed at step (158) in response to the first indication of a need for ABS via step (156), the wheel brake pressure existing at that time represents the initial trapped pressure and the trapped volume of fluid represents the closed system working fluid. As previously indicated, since the piston was initially retracted at the time the valve (46) is first closed, further extension of the piston (32) toward the fully extended home position provides for an increase of the pressure beyond the initial trapped pressure with the amount of pressure increase before the ball (36) is unseated from the seat (38) being represented by the amount of retraction of the piston at step (142).

The routine then proceeds to step (160) where the antilock braking mode is obtained from a ROM lookup table as a predetermined function of wheel slip and wheel acceleration. The ROM lookup table provides for multiple number of apply modes, such as 3, each having a related rate of increase in brake pressure as a function of wheel acceleration and wheel slip, a multiple number of release modes, such as 3, each having a related pressure release and a pressure hold period, and a hold mode representing a condition whereat the brake pressure is to be maintained at a constant value. In general, the apply modes are stored as a function of wheel slip and acceleration representing a wheel recovery condition and provide for higher rates of increase in brake pressure with increasing values of wheel acceleration and decreasing values of wheel slip. The release modes are stored as a function of wheel slip and acceleration representing an incipient wheel lock condition.

The hold mode is stored in the table at locations addressed by combined values of wheel slip and acceleration representing onset of an incipient wheel lock condition.

The lookup table establishes the particular brake mode as a function of wheel acceleration and wheel slip with the table being pre-established so as to provide a threshold between the brake pressure apply, release and hold modes such that when the combination of wheel acceleration and wheel slip represents an incipient wheel lockup condition, the table indicates one of the brake release modes whereas if the combination of wheel acceleration and wheel slip represents a recovered condition, the lookup table indicates one of the brake apply modes.

It is at this step (160) where the ABS control is made more sensitive to wheel slip to thereby desensitize the ABS control to the rapid rise in wheel slip in response to the sensitive mode indicated at step (153). When a normal mode is indicated via step (150), the lookup table determining the brake mode is addressed at step (160) based on actual values of wheel slip and acceleration computed at step (104). This results in a normal determination of the release, apply, and hold modes. However, if a sensitive mode is indicated at step (153), step (160) first adds a predetermined slip value to the wheel slip otherwise determined at step (104) before addressing the lookup table. By addressing the lookup table with the modified increased slip value, release modes will be indicated at lower actual values of wheel slip. The effect is the same as reducing the slip thresholds representing an incipient wheel lockup condition for entry into the release phase from the apply phase in the ABS pressure cycle. In another embodiment, the acceleration term may also be modified to achieve the same effect.

When a release mode is indicated at step (160) in response to an incipient wheel lockup condition, the routine proceeds to a step (162) where the commanded position CPOS of the piston (32) of the associated wheel brake modulator (16) is set to a full release position for a predetermined period that is a function of the particular release mode determined at step (160). The step (164) then determines whether or not the period that the commanded position is established at the fully retracted position of the piston (32) has expired. If not, the program proceeds directly to a step (166) where a proportional current control term IP is determined as a predetermined function of the position error represented by the difference between the commanded position CPOS and the actual position APOS obtained from the counter (70) of FIG. 3. Also at step (166), a derivative current command term ID is determined as a predetermined function of the rate of change in position error. The final current command value Icmd is determined at step (156) as the sum of the proportional and derivative control terms. This value is then provided to the corresponding digital-to-analog converter (70) for controlling the modulator (16) associated with the selected wheel.

Returning to step (164), when the routine determines that the period for release for the selected wheel has expired, the mode is set to a hold mode at step (170) with a hold period identified based upon, for example, the particular release mode determined at step (160). Thereafter, at step (172) for the selected wheel, a hold mode is executed for a predetermined number of interrupt cycles by freezing the commanded position CPOS at the actual position of the armature (32) represented by the output of the counter (70).

When step (160) determines an apply mode such as when wheel slip and acceleration indicate the wheel has recovered from the incipient wheel lock condition, a step (178) is executed to establish the commanded position for apply. At step (178), the commanded position of the piston (32) is initialized to a predetermined substantial fraction of the maximum position of the piston during the previous cycle. The maximum position represents maximum brake pressure corresponding in time to the step (156) first indicating a release mode. This piston position (brake pressure) represents the pressure substantially corresponding to the maximum braking force for the vehicle wheel. By setting the commanded position CPOS at a predetermined fraction of the maximum position during the prior cycle, the brake pressure is quickly established at a pressure substantially at the pressure producing a maximum braking force between the tire and road surface. Thereafter, via repeated executions of the step (178) for the selected wheel, the commanded position CPOS ramped at a rate that is a predetermined function of the particular apply mode determined by step (160) and the normal or slow apply rate indicated by step (150) or step (153). A normal predetermined apply rate corresponding to the apply mode determined at step (160) is used if step (150) indicated a normal apply rate. However, if step (153) indicated a slow apply rate, the ramp rate established by step (178) is less than the corresponding normal ramp rate by a predetermined amount to provide for a less aggressive response to wheel slip conditions when the piston reaches the home position. The resulting current command is established via steps (166) and (168) as previously described. Through repeated executions of the routine of FIG. 6, the position of the piston (32) is continually modulated to modulate the wheel brake pressure for antilock controlled braking to prevent wheel lockup.

The steps (146-152) of FIG. 4 are repeated for each braking channel as previously described. Following execution of the routine (152) for each braking channel, the routine then exits at step (144). Upon the receipt of the next control cycle interrupt, the routine of FIG. 4 is again repeated as described.

In summary, by initializing the position of the piston (32) at a position away from the home position, the potential of the check valve being opened by the piston during normal ABS controlled pressure cycling is reduced. By anticipating the opening of the check valve and (A) setting the wheel lock control parameters to make the system more sensitive to wheel slip and (B) ramping the brake pressure at a lower rate during the apply phase, the effects of the unavoidable opening of the check valve during normal ABS controlled pressure cycling are minimized.

The foregoing description of a preferred embodiment of the invention for purposes of illustrating the invention is not to be considered as limiting the invention since many modifications may be made by the exercise of skill in the art without departing from the scope of the invention.

We claim:

1. An antilock braking system for a wheel of a vehicle traveling over a road surface comprising:
   a master cylinder for supplying pressurized fluid;
   a wheel brake responsive to pressurized fluid for braking the vehicle wheel;

a pressure modulator comprising a fluid displacement piston disposed for reciprocal movement within a bore, the piston having a home position whereat the piston is at an extended limit of travel at which the bore has a minimum volume;

means for providing fluid communication between the bore and the wheel brake;

a normally open valve operable to a closed position;

means for coupling the pressurized fluid from the master cylinder to the bore and the wheel brake through the normally open valve for braking the vehicle wheel in accord with the fluid pressure when the normally open valve is open, the normally open valve when operated to the closed position isolating the pressurized fluid output of the master cylinder from the bore and wheel brake and establishing a closed braking system for the wheel brake wherein reciprocal movement of the piston provides for modulation of the fluid pressure at the wheel brake;

a normally closed check valve in parallel with the normally open valve, the check valve being opened by a pressure in the closed system greater than the pressure of the pressurized fluid supplied by the master cylinder to couple the pressurized fluid from the master cylinder to the bore and the wheel brake independent of the normally open valve to limit the fluid pressure in the closed system and being opened by the piston when the piston is moved to the home position to couple the pressurized fluid from the master cylinder to the bore and the wheel brake independent of the normally open valve;

means for sensing the position of the piston in the bore;

means for initializing the piston at an initial position spaced from the home position by a predetermined distance, the check valve being closed when the piston is at the initial position; and antilock control braking means responsive to predetermined wheel parameters for determining a requirement for antilock control braking and when the requirement for antilock controlled braking is determined:

(a) operating the normally open valve to a closed position, the fluid pressure in the closed system when the normally open valve is first operated to the closed position comprising an initial trapped fluid pressure;

(b) modulating the position of the piston in the bore to modulate the fluid pressure in the closed system at the wheel brake in accord with an ABS pressure cycle including release phase initiated in response to an incipient wheel lock condition wherein the piston is moved away from the home position to release the fluid pressure at the wheel brake to allow recovery from the wheel lock condition and an apply phase wherein the piston is moved toward the home position at a predetermined rate to increase the fluid pressure at the wheel brake at the predetermined rate, and (c) when the sensed position of the piston during the apply phase represents an impending opening of the check valve by the piston, decreasing the predetermined rate.

2. An antilock braking system for a wheel of a vehicle traveling over a road surface comprising:

a master cylinder for supplying pressurized fluid;

a wheel brake responsive to pressurized fluid for braking the vehicle wheel;

a pressure modulator comprising a fluid displacement piston disposed for reciprocal movement within a bore, the piston having a home position whereat the piston is at an extended limit of travel at which the bore has a minimum volume;

means for providing fluid communication between the bore and the wheel brake;

a normally open valve operable to a closed position;

means for coupling the pressurized fluid from the master cylinder to the bore and the wheel brake through the normally open valve for braking the vehicle wheel in accord with the fluid pressure when the normally open valve is open, the normally open valve when operated to the closed position isolating the pressurized fluid output of the master cylinder from the bore and wheel brake and establishing a closed braking system for the wheel brake wherein reciprocal movement of the piston provides for modulation of the fluid pressure at the wheel brake;

a normally closed check valve in parallel with the normally open valve, the check valve being opened by a pressure in the closed system greater than the pressure of the pressurized fluid supplied by the master cylinder to couple the pressurized fluid from the master cylinder to the bore and the wheel brake independent of the normally open valve to limit the fluid pressure in the closed system and being opened by the piston when the piston is moved to the home position to couple the pressurized fluid from the master cylinder to the bore and the wheel brake independent of the normally open valve;

means for sensing the position of the piston in the bore;

means for initializing the piston at an initial position spaced from the home position by a predetermined distance, the check valve being closed when the piston is at the initial position;

means for determining wheel slip;

antilock control braking means responsive to predetermined wheel parameters including the determined wheel slip for determining a requirement for antilock control braking and when the requirement for antilock controlled braking is determined:

(a) operating the normally open valve to a closed position, the fluid pressure in the closed system when the normally open valve is first operated to the closed position comprising an initial trapped fluid pressure;

(b) determining an incipient wheel lock condition when a predetermined function of the determined wheel slip exceeds a predetermined threshold;

(b) modulating the position of the piston in the bore to modulate the fluid pressure in the closed system at the wheel brake in accord with an ABS pressure cycle including release phase initiated in response to the determined incipient wheel lock condition wherein the piston is moved away from the home position to release the fluid pressure at the wheel brake to allow recovery from the wheel lock condition and an apply phase initiated in response to wheel recovery from the determined wheel lock condition wherein the piston is moved toward the home position to increase the fluid pressure at the wheel brake, and (c) when the sensed position of the piston during the apply phase represents an impending opening of the check valve by the piston, increasing the determined wheel slip by a predetermined offset value so that the incipient wheel lockup condition is determined at a lower actual wheel slip to initiate the release phase at the lower actual wheel slip.

3. An antilock braking system for a wheel of a vehicle traveling over a road surface comprising:

a master cylinder for supplying pressurized fluid;

a wheel brake responsive to pressurized fluid for braking the vehicle wheel;

a pressure modulator comprising a fluid displacement piston disposed for reciprocal movement within a bore;

means for providing fluid communication between the bore and the wheel brake;

a normally closed check valve;

a normally open valve in parallel with the check valve and operable to a closed position;

means for coupling the pressurized fluid from the master cylinder to the bore and the wheel brake through the normally open valve for braking the vehicle wheel in accord with the fluid pressure when the normally open valve is open, the normally open valve when operated to the closed position while the check valve is closed isolating the pressurized fluid output of the master cylinder from the bore and wheel brake and establishing a closed braking system for the wheel brake having an initial trapped fluid volume and an initial trapped fluid pressure, wherein reciprocal movement of the piston provides for modulation of the fluid pressure at the wheel brake, the check valve being opened by the piston when the piston is moved to an extended position to couple the pressurized fluid from the master cylinder to the bore and the wheel brake independent of the normally open valve;

means for initializing the piston at an initial position spaced from the extended position by a predetermined distance whereat the check valve is closed and the trapped fluid volume when the normally open valve is operated to the closed position is a predetermined volume;

means for sensing a requirement for antilock controlled braking;

means responsive to the sensed requirement for antilock controlled braking for closing the normally open valve and modulating the piston position in the bore to modulate a volume of fluid displaced in the bore to thereby modulate the fluid pressure at the wheel brake to control wheel slip between the wheel and the road surface, whereby the modulated fluid pressure may be increased above the initial trapped fluid pressure for controlling the wheel slip by movement of the piston toward the extended position from the initial position.

4. The antilock braking system of claim 3, wherein the initial position is spaced from the extended position by an amount providing an increase in fluid pressure at the wheel brake above the initial trapped fluid pressure by a predetermined amount when the piston is positioned to the extended position.

5. The antilock braking system of claim 4, wherein the predetermined amount of increase in fluid pressure is a predetermined function of a predetermined vehicle rear to vehicle front weight transfer during vehicle braking.

* * * * *